Figure 1:
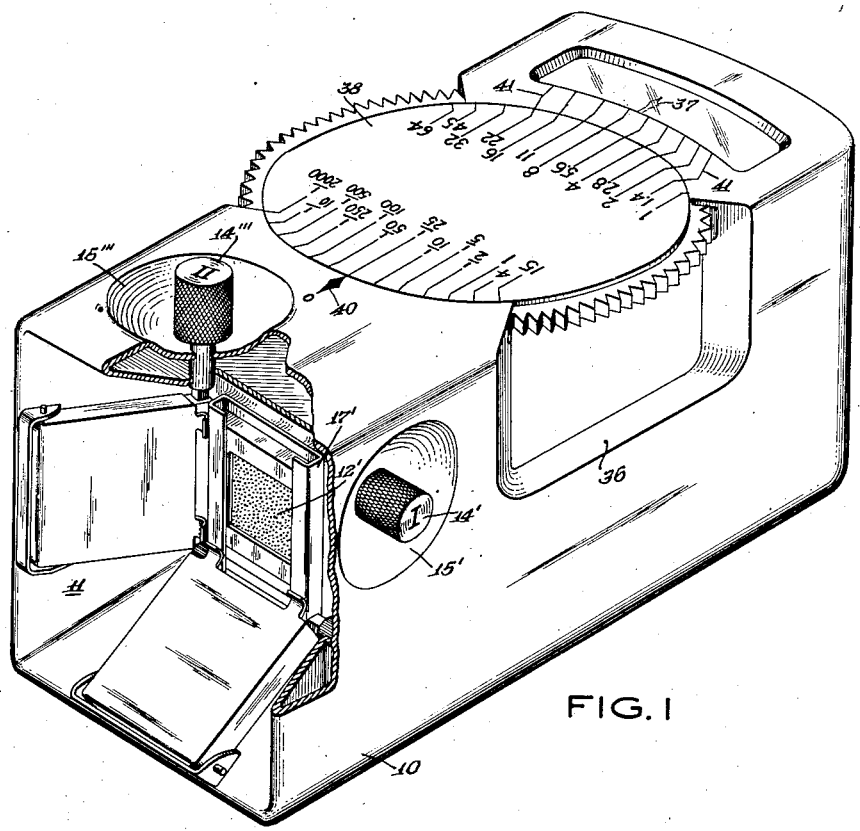

Dec. 30, 1941. J. M. BING 2,268,105
PHOTOMETRIC DEVICE
Filed July 24, 1940 4 Sheets-Sheet 1

INVENTOR.
JOSEPH M. BING
BY
ATTORNEY.

Dec. 30, 1941.     J. M. BING     2,268,105
PHOTOMETRIC DEVICE
Filed July 24, 1940     4 Sheets-Sheet 2

FIG. 2-A

FIG. 10-A

INVENTOR.
JOSEPH M. BING
BY
ATTORNEY.

Dec. 30, 1941.  J. M. BING  2,268,105
PHOTOMETRIC DEVICE
Filed July 24, 1940    4 Sheets-Sheet 3

INVENTOR.
JOSEPH M. BING
BY
ATTORNEY.

Dec. 30, 1941.　　　　J. M. BING　　　　2,268,105
PHOTOMETRIC DEVICE
Filed July 24, 1940　　　4 Sheets-Sheet 4
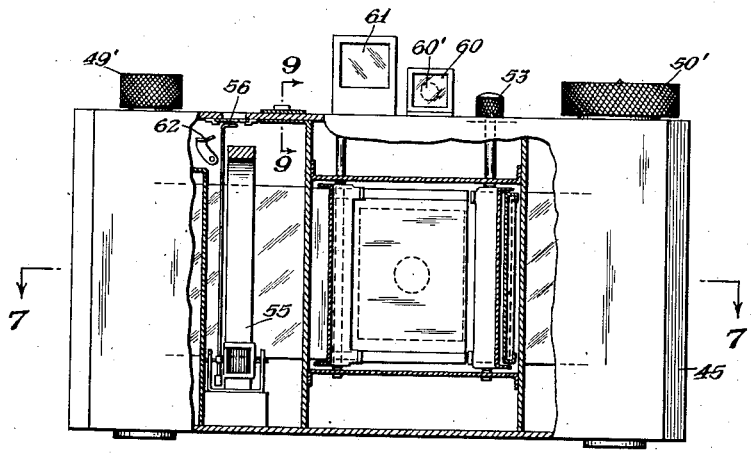
FIG. 6
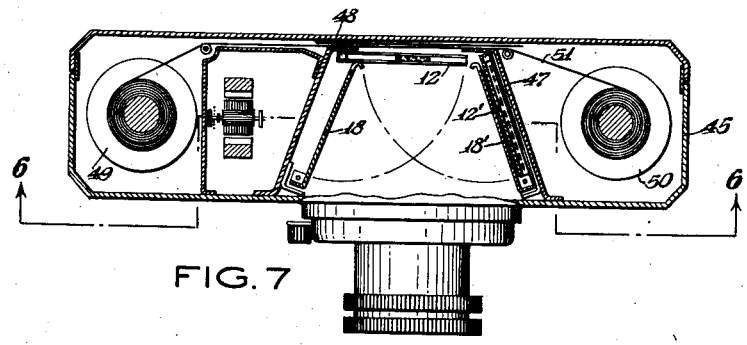
FIG. 7
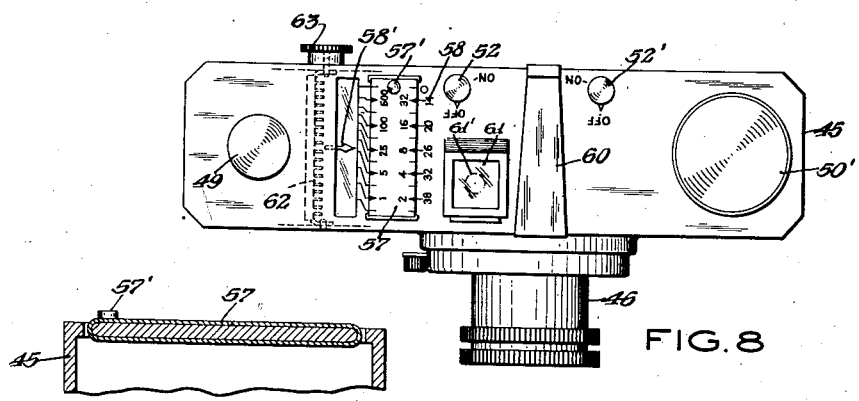
FIG. 8
FIG. 9
INVENTOR.
JOSEPH M. BING
BY
ATTORNEY.

Patented Dec. 30, 1941

2,268,105

UNITED STATES PATENT OFFICE 2,268,105

PHOTOMETRIC DEVICE

Joseph M. Bing, New York, N. Y.

Application July 24, 1940, Serial No. 347,261

16 Claims. (Cl. 88—23)

The present invention relates to improvements in photoelectric exposure meters which may be used as an accessory for, or may be structurally combined with, a camera, printing machine or other photographic reproducing or recording apparatus and which depend for their action upon the property of photo-voltaic or other types of photoelectric cells to produce an electric current whose strength varies in proportion to the intensity of light reflected from a photographic scene or object or emanating from any other source and exciting the sensitive surface of the photoelectric cell. This current is measured by means of a suitable electrical measuring instrument such as a microammeter having a needle or pointer whose deflection will be an index of the existing object or scene brightness.

Among other considerations, usually two major requirements must be complied with in the design and construction of exposure meters of the above character. In the first place it is necessary to provide suitable means adapted to restrict the effective response or acceptance angle of the meter so as to encompass a limited angular spread in both a horizontal and vertical direction in such a manner as to allow light rays only that emanate from an object or scene reproduced on the film or plate in the camera, to affect the sensitive surface of the photoelectric cell and to prevent extraneous light emanating from objects outside the camera field from exciting the photoelectric cell and causing erroneous light measurement and in turn a faulty exposure information resulting in an over or under exposed picture. In the second place exposure meters, if not designed for a specific and limited use, require the provision of a computing device or direct organic connection with one or more exposure controlling organs of a camera or equivalent apparatus to evaluate the indication of light values measured by the instrument in terms of photographic exposure data i. e. coordinated lens aperture and exposure time values for other given conditions such as emulsion speed, etc., or alternatively, to directly set an exposure control organ of a camera in dependence upon the pointer deflection of the measuring instrument as is customary in automatic exposure control devices for cameras, projection printers and like apparatus.

An object of the present invention is to increase generally the versatility of a photoelectric exposure meter without unduly complicating its operation and adjustment during use.

Another object is to extend the operating range of a photoelectric exposure meter by the provision of simple means to afford optimum response or indication under the most adverse operating conditions such as both in very poor light as in the case of dark shadows or interiors as well as in brilliant sunlight as in the case of seascapes and all intervening conditions for both daylight and artificial illumination.

Another object is to provide an exposure meter structurally embodied or built in a photographic camera in such a manner that the meter will be normally placed in a position so as not to interfere with the proper functioning of the camera and may be moved instantly into operative position if an exposure measurement is desired in such a manner as to be excited substantially by light rays reflected from the object or scene reproduced upon the plate or film in the camera.

A more specific object is the provision of a photoelectric exposure meter built in a photographic camera which will allow a measurement of light rays reflected from a limited fractional area of an object or scene to be photographed being of major pictorial interest in the final print and which is to be exposed correctly in preference to the remaining portions of the scene or object which latter will be sufficiently rendered due to the exposure latitude of the sensitive emulsion on the film or plate.

Still another object is to provide an exposure meter which will allow optionally to measure both the average or integrated brightness value of a scene or object reproduced upon the film or plate in the camera in case that all the parts of the scene are of substantially equal pictorial value such as in a landscape or architectural view, as well as the brightness of a limited fractional area of a photographic scene or object such as the head of a person or any other object which portion of the picture being of major pictorial value in the final print will be determinative of the correct exposure to be given, while the remainder of the scene or picture being of lesser importance in a pictorial sense will be taken care of sufficiently due to the latitude of the sensitive emulsion of the film or plate.

Another object is to measure exclusively and selectively that type of light which is of a certain color or color range, corresponding to a specific wave length or wave length bands, to the exclusion of all other light, which necessity arises, for instance, in tri-color photography and many other practical and scientific uses of photography.

Still another object is the provision of a photoelectric exposure meter having a plurality of photoelectric cells of different characteristic normally in an inoperative position and which may be instantly selectively placed in operative position to vary the opening characteristics of the meter to suit various requirements in practice.

Figure 2:
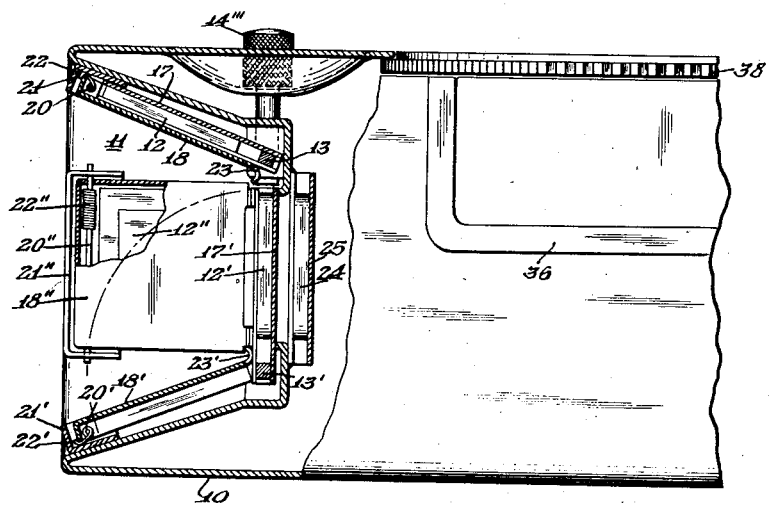
Figure 10:
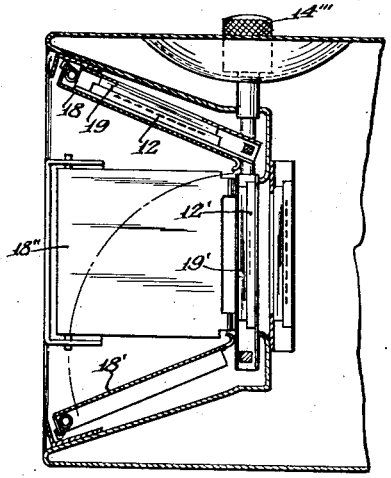
Figure 10:
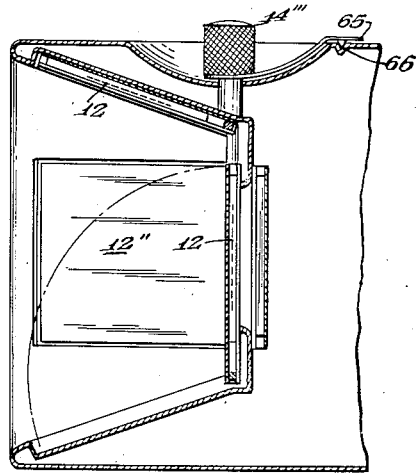
Figure 11:
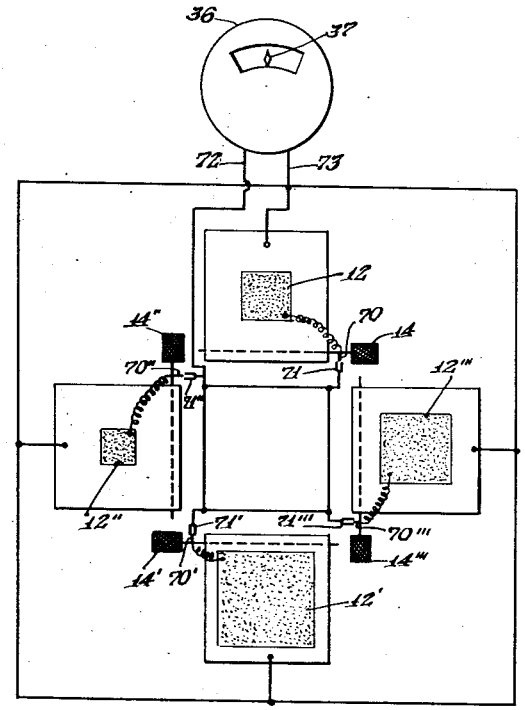
Figure 3:
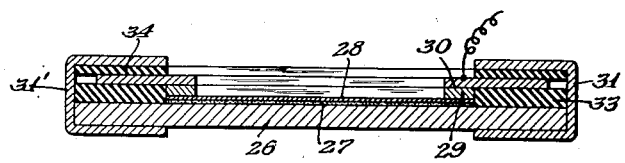
Figure 4:
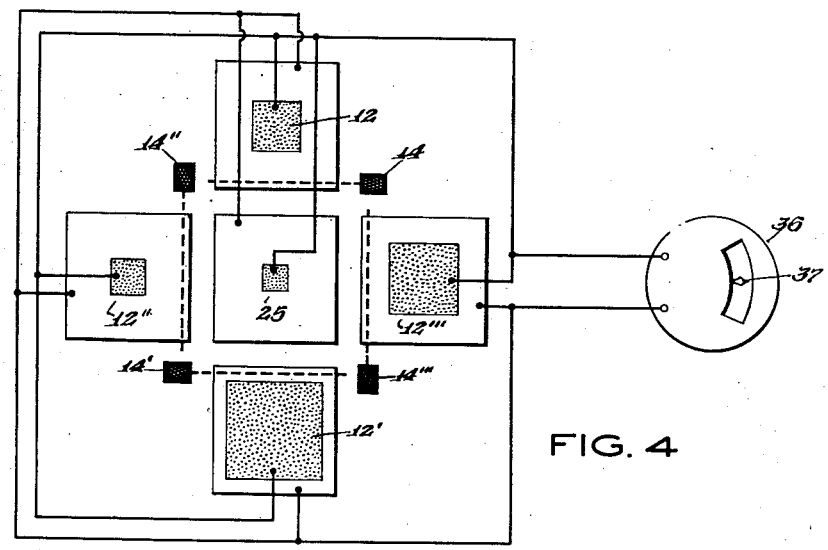
Figure 5:
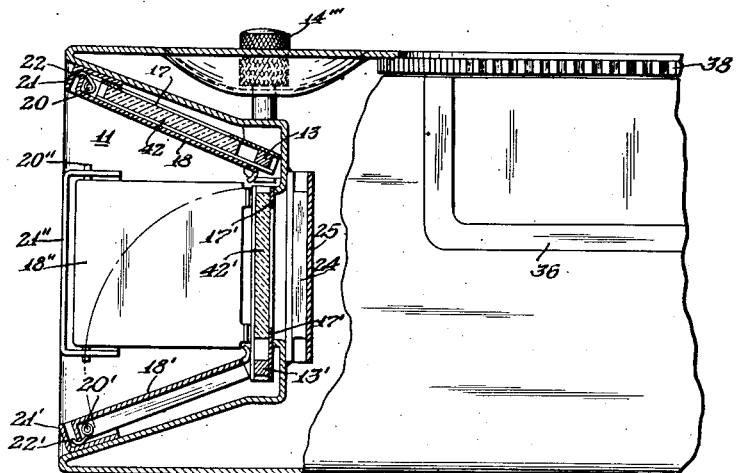

The above and further objects and aspects of the invention will become more apparent from the following detailed description taken with reference to the accompanying drawings forming part of this specification and wherein:

Figure 1 is an isometric view, with parts broken away, of an exposure meter construction embodying the principle of the invention, Figure 2 is a fractional longitudinal cross-section through the exposure meter shown in Figure 1, Figure 2A is a schematic view of a meter similar to Figure 2 showing a modification of the invention, Figure 3 is a cross-section on an enlarged scale through a photoelectric cell suited for a meter of the type shown in Figures 1 and 2, Figure 4 is a diagram showing the photoelectric cells and their electrical connection in the meter illustrated in the preceding figures, Figure 5 is a cross-sectional view through a meter similar to Figure 2 showing a modification of the invention, Figure 6 is a vertical cross-sectional view in a camera having an exposure meter structurally combined therewith using the principle of the invention, Figure 7 is a horizontal cross-section taken on line 7—7 of Figure 6, Figure 8 is a top view of Figure 6, Figure 9 is a detailed sectional view taken on line 9—9 of Figure 6, Figure 10 is a schematic sectional view through a meter according to the invention showing a simplified modification thereof, Figure 10A shows a modification of a construction according to Figure 10, and Figure 11 is a diagram similar to Figure 4 showing a modified circuit arrangement for the photoelectric cells and the measuring instrument in a photometric system according to the invention.

Like reference characters identify like parts in the different views of the drawings.

With the aforementioned and further objects in view, as will appear as the description proceeds, the invention involves in general the provision of one or more photoelectric cells of different characteristics such as size and effective area or spectral response sensitivity, or alternately a single cell in combination with a plurality of modifying elements such as optical filters, whereby said cells or modifying elements when not in use are concealed or protected so as not to interfere with the functioning of the meter or other apparatus, while any of the cells or modifying elements may be selectively placed in operative position to suit various conditions with regard to operating range, spectral characteristics of the light to be measured and other requirements.

Referring more particularly to Figure 1, there is shown an isometric view, with parts broken away, of a photoelectric exposure meter embodying the principle of the invention and comprising a casing 10 consisting of an artificial resinous material such as Bakelite or any other suitable material. Casing 10 is provided with an open end forming the base of a frustro-pyramidal chamber 11 which serves as a means to confine light rays entering the casing to a bundle of predetermined angular spread corresponding to the field angle of a camera in connection with which the meter is destined to be used. For average work this angle will be about 50 degrees corresponding to the normal field angle of the ordinary photographic camera. In the example shown the chamber 11 is of square cross-section to provide four preferably flat walls between the outer edges and the inner boundary surface or apex of the chamber.

There are provided in accordance with the invention one or more photoelectric cells 12, 12', 12", etc., hingedly secured to the inside walls of chamber 11 at the apex side thereof such as by the aid of square shafts 13, 13', etc., carrying sleeves at both ends. The sleeves are passed through corresponding bores in the casing 10 serving as bearings for the shafts and terminate in suitable adjusting members such as knurled knobs 14, 14', etc., arranged within depressed portions or recesses 15, 15', etc., of the casing. The photoelectric cells of any suitable construction, such as will be described in detail later, are suitably held within resilient frames 17, 17', etc., having lateral square openings through which are passed the shafts 13, 13', etc. In the aforedescribed arrangement, the photoelectric cells will normally lie against the walls of the chamber 11 in the non-operative position and may be swung into operative position in front of and parallel to the apex or inner boundary surface of the chamber by turning the respective knobs 14, 14', etc., as shown for cell 12' shown in the operative position in the drawing.

In order to cause only the cell which is in operative position, i. e. cell 12' in the example shown, to be excited by light rays entering the chamber 11 and to substantially prevent the remaining idle cells from being affected by such light rays and, furthermore, to prevent reflection from the back of the non-operative cells to reach and affect the operating cell, there are further provided non-reflecting shields or cover members 18, 18', etc., also hingedly connected to the walls of chamber 11 in such a manner as to conceal and protect the photoelectric cells in their non-operative position and adapted to be lifted and returned about their pivotal axes so as not to obstruct the movement of the photo-electric cells to and from their operative position. In the example shown the cover members 18, 18', etc., are formed with lateral walls to afford efficient and complete protection of the photo-electric cells against light rays entering the chamber 11 and are further provided with extending studs of shafts 20, 20', etc., passed through holes in the brackets 21, 21', etc., secured to the outer edge of the walls of the light chamber.

The cover members 18, 18', etc., may be urged against the photoelectric cells by any suitable force such as gravity and lifted and returned manually when adjusting the photoelectric cells from their non-operative position to their operative position and vice versa. Alternatively, the cover members are urged against the photoelectric cells by spring action to afford automatic lifting and return to their resting position while moving the photoelectric cells from their non-operative to their operative position and vice versa. In the example illustrated there are provided for this purpose coil springs 22, 22', etc., encircling and intervening between the shafts 20, 20', etc., and the casing in such a manner as to urge the cover members against their respective photoelectric cell.

The operation of the device described will be as follows: As a photoelectric cell 18, 18', etc. is turned from its non-operative to its operative position by rotating the corresponding adjusting knob 14, 14', etc., the cell or its holder will turn the cover in the opposite direction about its pivotal axis against the action of the springs 22, 22', etc., thereby tensioning the latter in such a manner that as the free end of the cell leaves the free end of the cover the latter will return to its original position allowing the rotation of the cell to be continued until reaching the operative position as shown for the cell 12' in the drawing. In this position the cell is held and prevented from returning due to its own weight by the free edge of the cover serving as stop or abutment for the cell as seen from the drawing. During the return movement, when the cell is turned in the opposite direction, the free edge of the cover member will glide along the cell or its holder thereby lifting and rotating the former about its pivotal axis until the free edge of the cell passes the free edge of the cover, whereupon the latter will reverse its movement and follow the cell by virtue of the action of the springs 22, 22', etc., until reaching the original position, when the cover member completely protects and conceals the cell. In order to prevent jamming or clogging and to afford a smooth starting at the initiation of the return movement the free edge of the cover member is suitably rounded or otherwise shaped such as by the provision of trough shaped lugs or extensions shown at 23, 23', etc.

As is understood, by the employment of a selective mount in an apparatus such as an exposure meter as described hereinabove, it is possible to provide a plurality of photoelectric cells normally supported or placed in non-operative position so as not to interfere with the proper function of the meter or other apparatus in such a manner that any of the cells may be instantly selected and placed into operative position to obtain special effects and various results as will become apparent as the description proceeds.

If desired a fifth cell 24 mounted in a frame 25 may be provided fixedly secured against the inner boundary surface or apex of the chamber 11, whereby a total number of five cells will be available in the example illustrated to obtain various results and to increase the versatility and extend the use of the meter. As is understood, the number of cells may be further increased by employing a frustro-pyramidal chamber of polygonal cross-section having more than four lateral walls.

The photoelectric cells may be the photo-voltaic or self-generating type and may be of any suitable construction. A structure suited for the purpose of the invention is shown in Figure 3 which represents an enlarged cross-section through a photo-voltaic cell. The latter comprises in a known manner a metallic base electrode 26 covered with a thin crystalline layer 27 of light-sensitive material such as selenium, cuprous oxide or the like which in turn is coated with a translucent covering layer or electrode 28 consisting of gold, platinum or any suitable combination of such layers well known to those skilled in the art, all the layers being intimately molecularly united with each other. If a cell of this type is struck by light in the direction of the arrows and passing through the covering layer 28 on to the light sensitive layer 27, an electromotive force will be set up between the base and covering electrode which in turn will cause an electric current to flow through a measuring instrument connected to these electrodes. The strength of this current is substantially proportional to the intensity of the impinging light rays exciting the sensitive surface of the cell. In order to establish electric contact to the thin covering electrode 28, there are sprayed onto the outer edge of the covering layer strips 29 of a suitable metal such as Wood's metal. A resilient metal frame 30 or ring is clamped against the contacting strips 29 by means of clamps 31 and 31', with suitable insulating elements 33 and 34 being interposed to prevent direct electrical contact between the base and covering electrodes. A cell of this type can be easily mounted by sliding the same into the frames 17 and 17', etc., as shown in Figures 1 and 2 whereby the frames by reason of their resiliency will engage the clamps 31 and 31' to establish electrical connection with the base electrode 26. The connection of opposite polarity may be suitably effected such as by a flexible conductor 25 soldered to the resilient contact frame or ring 30.

In the embodiment shown all the photoelectric cells are connected in parallel to a common measuring instrument or microammeter 36 as shown more clearly by the wiring diagram of Figure 4. However, since only one single cell can be placed in operative position at a time, only this cell will produce a current passing through the instrument while the remaining cells will be idle, since they are completely concealed and covered in the manner described.

The measuring instrument 36 is mounted in the casing 10 in any suitable manner. The casing is provided with a viewing window in its upper surface through which the pointer 37 of the instrument is visible. Thus, the deflection of the pointer will be an index of the existing object or scene brightness, if the meter is held with its opening facing a photographic scene or object, as will be understood from the above.

The provision of a plurality of photoelectric cells each of which may be placed selectively in operative position in the manner described, may serve different purposes and for securing various results and effects some of which are described in the following.

According to one embodiment the several photoelectric cells may be of different size, that is, with respect to their effective surface areas (27 according to Figure 3) and are connected in parallel in the manner shown in Figure 4. In this case each cell will provide a different measuring range, thus adapting the meter to cover an extended range of light conditions starting from dark interiors, when the cell with the largest effective area is used, to brilliant sunlight or seascapes, in which case the cell of smallest effective area is placed in operative position. The different measuring or indicating ranges can be suitably identified upon the adjusting knobs 14, 14', etc. and on the meter by the provision of a plurality of correspondingly calibrated scales for the separate operating ranges well understood by those skilled in the art.

The photoelectric cells having different effective areas or sensitivity may also serve to represent any other parameter or exposure control factor such as emulsion speed, lens diaphragm aperture, exposure time, filter factors and others. Thus in a most simple embodiment the meter may be designed especially for motion picture work and each photoelectric cell designed to represent a different emulsion speed for both black and white and color film. If in this case only the normal number of frames, that is 16 frames per second, is of interest, the scale deflection of the pointer 37 may be directly calibrated in diaphragm aperture numbers without requiring any converting or computing device. Thus, there will be obtained a meter requiring no manipulation or adjustments when taking a reading and enabling an instant exposure indication. Higher or lower frame numbers may be taken care of by changing the photoelectric cells to the next lower or higher emulsion speed, respectively. It will be possible in this manner to work out a limited number of possible combinations of the usual all-around emulsion speeds and frame numbers to obtain a meter both of simple design and easy to use and operate.

If a more versatile meter is desired such as in the case of still photography either a suitable slide rule type computing device may be provided or the deflection of the pointer 37 may serve by the provision of suitable automatic adjusting means to set an exposure control organ as is customary in automatic exposure control devices for photographic cameras. Thus, referring to Figure 1, there is shown a simple computing device for the sake of illustration comprising a knurled disc 38 rotatably mounted upon the upper face of the casing adjacent to the viewing opening for the pointer 37 and provided in the example shown with a pair of adjacent peripheral scales, one of which represents exposure times (from 15 seconds to 1/1000 second) while the other represents lens diaphragm aperture numbers (from f/1 to f/64). Item 40 is an index or mark upon the casing and 41 are guide lines or channels upon the casing connecting the uniformly spaced scale divisions of the disc 38 to points on the lower edge of the viewing window of non-uniform spacing to coordinate the non-linear deflection of the pointer 37 with the linear or equally divided scale divisions on the adjusting disc 38. In operation the photoelectric cell corresponding to the specific emulsion speed used is placed in operative position by turning the corresponding knob 14, 14', etc. and left in this position as long as the particular film or plate is used by the photographer. Then the disc 38 is set so that the desired shutter speed number such as 1/25 sec. as shown is opposite to the arrow or index 40. When carrying out a measurement the meter is pointed with its opening facing a photographic scene or object, whereupon the required diaphragm aperture may be directly read by ascertaining the respective number on the disc 38 at the end of the guide line or channel 41 starting at the pointer 37.

In automatic diaphragm control devices such as of the type employed in the Super Kodak 620, or others, the separate photoelectric cells may serve for varying the emulsion speed or the shutter speed to increase the versatility of cameras of this kind.

In place of photoelectric cells of different size or effective area as shown in Figure 4 cells of substantially the same effective area may be provided but varying in any other characteristic such as with respect to their spectral sensitivity. Thus, there may be employed cells being especially sensitive to red, blue and green light to afford a selective measurement in color photography, or in other words to measure only light of such character or color as will affect the sensitive emulsion and to which justice must be done in preference to other colors not affecting the emulsion in an effort to insure accurate exposure results. Color-sensitive photoelectric cells to be used for the purpose of the invention have already become known in the art. In an alternative arrangement employing cells of the ordinary type having a response range corresponding substantially to the visual sensitivity of the human eye, the desired color sensitivity may be obtained by the provision of suitable optical filters placed in front of the cells such as by inserting the filters in the frames or holders 17, 17', etc. to be held in place by the resilient action of the frames. This has been illustrated schematically in Figure 2A wherein the photocells 12 and 12' are covered by filters 19 and 19' and fixedly held in place in the manner described, while the combined cells and filters are in turn protected by the hingedly secured and non-reflecting cover members 18 and 18', respectively, to protect the filters against scratching, fingermarks on the one hand and to prevent light reflections liable to interfere with the proper functioning and accuracy of the light measurement.

According to an alternative arrangement, as shown in Figure 5, a single photoelectric cell 24 may be provided fixedly secured to the inner side or apex of the chamber 11, while the remaining cells are replaced by optical filters 42, 42', etc. The filters may be either neutral density filters to vary the intensity of the light bundle entering the meter which will be equivalent to varying the size or effective area of the cell as shown in the preceding illustration, or the filters may be of the colored type to afford selective measurement of a desired partial range of the visual spectrum in a manner understood from the foregoing.

When using photocells responsive to different colors or when employing color filters for the different photocells in the manner described, the instrument will be suited for various uses both in photography and general physical science, such as for all kinds of photometric devices other than exposure meters such as pyrometers, calorimeters employing photocells or other sensitive devices responsive to radiation including both visible and invisible light, heat rays and the like. In an arrangement as shown in Figure 5 when using neutral density filters for limiting the intensity of the light bundle, the filters may be replaced by suitable shutters having openings or windows of varying areas to accomplish a similar purpose.

Referring to Figures 6 to 9, there is shown a further embodiment comprising a photoelectric cell mount according to the invention structurally embodied in a photographic camera. According to this modification one or more photoelectric cells are hingedly secured to the walls of a light chamber connecting the lens of a camera with the picture frame or negative carrier in such a manner that the cells are protected and fully concealed in the non-operative position so as not to interfere with the proper function of the camera, while adapted to be instantly placed in operative or measuring position directly in front of the film or picture frame in the camera. Arrangements of this type among other beneficial results have the advantage that the photoelectric cell is excited by exactly the same light as emanates from the scene or object to be photographed in exactly the same manner as the film or plate in the camera, thus entirely dispensing with a special light baffle or other means to confine the view angle required in meters forming a separate unit. Furthermore, the cell receiving the light through the same lens which passes it subsequently unto the sensitive emulsion, will also register the effect of the very same quality and quantity of light as reaches the emulsion and will be free from variations resulting from the different transmission characteristics of different lenses, such as absorption, refraction and obstruction to the passage of certain wave length, especially in the very actinic ultra-violet region.

The camera which is preferably of the miniature type as in the example illustrated comprises a body 45, an objective or lens mount 46 and a frustro-pyramidal chamber between the lens and the picture frame or film support 48 at the rear of the camera body. Item 49 and 50 are supply and take-up film spools and 50' and 49' are the winding and rewinding knobs for moving the film 51 past the picture frame 48 in a manner well understood by those skilled in the art.

A plurality of photoelectric cells, in the example shown two cells 12 and 12', are hingedly secured to a pair of opposite walls of the chamber 47 in a manner substantially similar to that described hereinbefore so as to lie against said walls in the non-operative position and to be fully concealed and protected by covers 18 and 18' and adapted to be swung to and from their operative position in front of the film 51 or picture frame 48 when carrying out a light measurement. The adjustment of the cells is suitably effected from the outside of the camera by the aid of suitable adjusting members such as knurled knobs 52 and 53, suitable marks being provided to indicate the on- and off-positions. The shafts for the cells are passed through the camera casing in a manner to prevent light from leaking into the camera by providing suitable light traps in the form of flanges fitting corresponding annular recesses in the bores through the casing.

Item 55 is a microammeter suitably built in the camera body such as between the film spool 49 and the chamber 47 as in the example shown and having a needle or pointer 56 the bent edge of which is visible through an opening or viewing window in the top surface of the camera. When it is desired to carry out a light measurement one of the photoelectric cells is turned into operative position by adjusting the respective operating knob to the "on" position causing excitation of the photoelectric cell by holding the camera facing the scene or object to be photographed whereby the pointer 56 will be deflected to an extent proportional to the existing scene or object brightness. The deflection of the pointer is then evaluated or converted either by a separate manipulation or automatically into proper terms of exposure for the camera. Thus, the deflection of the pointer 56 may serve to directly automatically or semi-automatically set or adjust one or more exposure control organs in any of the non-automatic exposure control devices, or the pointer may be arranged to cooperate with a computer to translate the brightness value indications into proper exposure values. Such a computer may be of any suitable type known. The computer shown in Figure 8 for the sake of illustration is substantially similar to the one shown in Figure 1. It will be understood that a plurality of photoelectric cells may be provided in the camera to take care of different emulsion speeds or other exposure factors in substantially the same manner as described hereinbefore. In Figure 8 the movable scale member 57 having adjacent diaphragm aperture and exposure time scales has the form of an endless strip passing through slots in the camera casing 11 and having an adjusting or setting knob 57'.

A special emulsion speed scale 58 is provided in the exemplification shown in Figures 6 to 9 in place of the simple index 14 shown in Figure 1, whereby the photoelectric cells 12 and 12' may serve for a different purpose described in the following: The photoelectric cell 18 in example shown has a relatively small effective area preferably of circular form as indicated in dotted lines in the drawing. As a result thereof, if the cell is in operative position, a corresponding limited area of the image reproduced by the lens will excite the cell and in turn the measuring instrument. This limited area of the image field exciting the photoelectric cell is suitably marked such as by a differently coated circle 60' in the view finder 60 of the camera. In this manner it is possible to excite the photoelectric cell by light rays emanating from a desired portion of the entire object field which is of major pictorial interest and should be correctly exposed in preference to the remaining portions of the scene of lesser pictorial value in the final print. To this end, in operation, the camera is held such as at eye level when using a finder of the type shown 60 with the field 60' directed so as to cover the object of preferred pictorial interest in the final print such as the head of a person, etc., whereby the exposure data obtained from such a measurement will do full justice to the part to be reproduced preferentially in its tonal values, while the remainder of the scene such as the background, etc. will be taken care of by the latitude of the sensitive emulsion.

When using an eye level finder, the meter may be mounted in such a manner that the end of the pointer or needle is visible in the finder or a suitabl entrapping device 62 in the form of a comb member having an adjusting knob 63 may be provided to fix the pointer deflection at the instant of the measurement and to allow proper reading after the camera has been withdrawn from the viewing position. Alternatively, a reflecting view finder 61 may be provided singly or additionally to the finder 60, in which case both the finder having a suitably marked limited area 60' and the needle 56 may be viewed in the same direction by a single observation and the proper diaphragm opening directly ascertained without the entrapping comb 62.

As is understood, in automatic exposure control the needle 56 need not be visible, it being necessary only in this case to hold the camera so that the most important part of the scene or object to be photographed comes within the field or area marked within the finder.

In order to obtain a correct measurement in case of scenes wherein substantially all parts are of more or less equal pictorial value, such as in the case of landscapes, architectural photography, there is provided in the example illustrated a second photoelectric cell having a sensitive area shown in dotted lines covering substantially the entire picture area reproduced by the lens. Therefore, the brightness measured will represent the average or integrated value of the brightness values of the different portions of the picture which values in this case will be determinative of the proper exposure to be given. In order to take into consideration the difference of operating range due to the different effective areas of the cells 12 and 12', either a plurality of scales may be provided on the computer or a neutral density filter may be placed in front of the larger cell 12' to restrict the intensity of the impinging light bundle so as to equalize the operating ranges of both cells.

In the foregoing the photoelectric cells have been shown and described in combination with cover members to protect the cells in the non-use position and to prevent undesirable light reflection. In a simplified embodiment the cover members may be omitted and the cells protected against lateral light rays by arranging them for instance so as to nest within suitable recesses in the walls of the light chamber. In this case the rear surface of the cells is coated with a suitable non-reflecting substance. An arrangement of this type is shown schematically in Figure 10 embodying only the hingedly mounted cells 12 and 12' shown in the non-operative position within recesses in the walls of the chamber so as to lie substantially flush in the manner indicated. In order to fix the on- and off-positions in this case the knobs 14, 14', etc. may be provided with a snap spring 65 having a projection 66 adapted to engage depressions in the casing or the limit positions of the cells may be fixed by means of stops in any suitable manner. In place of mounting the cells within recesses, they may be protected by lateral walls projecting at right angle to the walls of the light chamber as shown in Figure 10A. As is understood, the modification according to Figures 10 and 10A may be employed both in the embodiments of a separate meter as well as in a camera described by the preceding exemplifications.

Referring to Figure 11, there is shown a modified circuit arrangement for a meter comprising a plurality of photoelectric cells or other radiation responsive devices and a common measuring instrument. According to this modification the photocells which may have effective areas 12, 12', etc. of different size in a manner similar as shown in Figure 4, are electrically disconnected from the instrument 36 in the non-operative position and are selectively connected to the instrument when placed in operative position by the provision of suitable switching devices. The latter in the example illustrated and shown schematically comprises a first set of contacts 70, 70', etc. insulatingly mounted upon the photocells such as on the shafts of the cells and connected to the upper covering electrodes through suitable flexible connecting leads. There are further provided a set of cooperating contacts 71, 71', etc., respectively, mounted upon the meter casing. The contacting devices may have the form of knife switches as indicated or may be of any other suitable construction. The contacts 71, 71', etc. are all connected in parallel and to one terminal of the measuring instrument 36 through conductor 72 and similarly the base electrodes of the photocells are connected in parallel and to the other terminal of the instrument 36 through conductor 73. It is seen, that in this manner each photoelectric cell will be individually connected to the instrument when placed in operative position, while the remaining idle cells will be disconnected, thus preventing spurious light rays which might affect the idle cells from exerting any influence on the measuring instrument.

As will be evident the separate photoelectric cells provided in the camera according to Figures 6 to 9 may serve other purposes such as for selectively measuring different spectral ranges of light entering the camera in the case of three-color photography, infra-red photography, to coordinate the measurement with the special characteristics of the image to be reproduced and to insure accurate measuring results under the most varying operating conditions.

It will be evident from the foregoing that the invention is not limited to the specific exemplifications and details shown and disclosed herein for illustration, but that the underlying principle and novel inventive idea will be susceptible of numerous modifications and variations coming within the broader scope and spirit of the invention as defined by the appended claims. The specification and drawings are accordingly to be regarded in an illustrative rather than in a limiting sense.

I claim:

1. The combination with a photographic exposure meter comprising a photoelectric cell, a measuring instrument electrically connected to said cell and a baffle chamber having inner and outer open ends adapted to pass a light bundle of limited angular spread, of at least on photoelectric cell hingedly connected to an inner wall of said chamber adjacent to the inner end thereof so as to lie with its sensitive surface against said wall in the nonoperative position and adapted to be swung into operative position substantially transverse to said light bundle, and a cover member also hingedy connected to said wall and adapted to conceal said cell in the non-operative position and to be lifted about its pivotal axis so as not to obstruct the movement of said cell to and from its operative position.

2. The combination with a photographic exposure meter comprising a photoelectric cell, a measuring instrument electrically connected to said cell and a chamber having inner and outer open ends for passing a light bundle, of at least one photoelectric cell hingedly connected to an inside wall of said chamber adjacent to the inner end thereof so as to lie against said wall in the non-operative position and adapted to be swung into operative position substantially transverse to the direction of said light bundle, a cover member also hingedly connected to said wall resting against and concealing said cell in the non-operative position, and spring means arranged to urge said cover member against said cell to allow said cell to be swung to and from its operative position while lifting and allowing said cover member to return to its resting position.

3. The combination of a photographic exposure meter comprising a photoelectric cell and a measuring instrument electrically connected to said cell, of a frustro-pyramidal baffle chamber having an open outer base and inner apex adapted to pass a light bundle of limited angular spread, of at least one photoelectric cell hingedly connected to an inside wall in said chamber adjacent to said apex so as to lie with its sensitive surface against said wall in the non-operative position and adapted to be swung into operative position substantially transverse to said light bundle, and a cover member also hingedly connected to said wall and adapted to conceal said cell in its non-operative position and to be lifted about its pivotal axis so as not to obstruct the movement of said cell to and from its operative position.

4. The combination with a photometric device comprising a baffle chamber having inner and outer open ends adapted to pass a light bundle of limited angular spread, of a plurality of photoelectric cells, each of said cells being hingedly connected to an inside wall in said chamber adjacent to the inner end thereof so as to lie with their sensitive surfaces against said wall in the non-operative position and adapted to be selectively swung into operative position substantially transverse to said light bundle.

5. A photometric device as claimed in claim 4, wherein said photoelectric cells have different effective surface areas.

6. A photometric device as claimed in claim 4 including means whereby said photoelectric cells are excited by different spectral ranges of said light bundle.

7. A photometric device as claimed in claim 4 wherein said photoelectric cells have different effective surface areas and represent different values of an exposure controlling magnitude.

8. The combination with a photometric device comprising a baffle chamber having inner and outer open ends adapted to pass a light bundle of limited angular spread, of a plurality of photoelectric cells, each of said cells being hingedly connected to an inside wall in said chamber adjacent to the inner end thereof so as to lie with their sensitive surfaces against said wall in the non-operative position and adapted to be selectively swung into operative position substantially transverse to said light bundle, and a plurality of cover members also hingedly connected to said walls adapted to conceal said cells in the non-operative positions and to be lifted about their pivotal axes so as not to obstruct the movement of said cells to and from their operative positions.

9. The combination of a photographic exposure meter comprising a photoelectric cell, a measuring instrument electrically connected to said cell and a chamber having outer and inner open ends for passing a light bundle of limited angular spread, of at least one photoelectric cell hingedly connected to an inside wall of said chamber adjacent to the inner end thereof so as to lie against said wall in the non-operative position and adapted to be swung into operative position across the inner end of said chamber, a cover member hingedly connected to said wall near the outer end thereof to rest against and conceal said cell in the non-operative position, and spring means arranged to urge said cover member against said cell, whereby said cover member will be lifted and returned to and from its resting position about its pivotal axis when turning said cell from its non-operative to its operative position and vice versa, the free end of such cover member forming a stop for said cell in its operative position and being shaped to smoothly glide upon said cell at the initiation of a return movement of said cell.

10. A photometric device comprising a chamber having outer and inner open ends for passing a light bundle, a plurality of photoelectric cells hingedly connected to the inside walls of said chamber near the inner end thereof so as to lie against said walls in the non-operative positions and adapted to be selectively swung into operative position across the inner end of said chamber, a plurality of cover members hingedly connected to said walls near the outer ends thereof to rest against and conceal said photoelectric cells in their non-operative position, and spring means arranged to urge said cover members against said cells, whereby said cover members will be lifted from and returned to their resting positions about their pivotal axes when swinging said cells from their non-operative position to their operative position and vice versa, an electric measuring instrument, and circuit means for connecting all of said photoelectric cells in parallel to said instrument.

11. A photographic exposure meter comprising a casing having an opening for admitting light rays reflected from a photographic scene towards which the meter is pointed, a chamber adapted to confine the angular spread of said light rays behind said opening, at least one photoelectric cell hingedly connected to a wall of said chamber at the side opposite from said opening so as to lie with its sensitive surface against said wall in the non-operative position and adapted to be moved into operative position substantially normal of the light bundle entering said chamber, and a measuring instrument located within said casing and electrically connected to said cell, said instrument having a pointer visible through an opening of said casing.

12. A photographic exposure meter comprising a casing having an opening for admitting light rays reflected from a photographic scene towards which the meter is pointed, a chamber adapted to confine the angular spread of said light rays behind said opening, at least one photoelectric cell hingedly connected to a wall of said chamber at the opposite side from said opening so as to lie with its sensitive surface against said wall in the non-operative position and adapted to be moved into operative position substantially normal of the light bundle entering said chamber, and a cover member hingedly connected to said wall near said opening to conceal said cell in the non-operative position and adapted to be lifted about its pivotal axis and returned to its resting position when said cell is moved from its non-operative to its operative position and vice versa, and a measuring instrument located within said casing and electrically connected to said cell, said instrument having a pointer visible through an opening of said casing.

13. A photographic exposure meter comprising a casing having an opening to admit light rays reflected from a photographic scene towards which the meter is pointed, a chamber adapted to confine the angular spread of said light rays behind said opening, a plurality of photoelectric cells having varying characteristics hingedly connected to the walls of said chamber at the side opposite from said opening so as to lie with its sensitive surface against said walls in the non-operative position and adapted to be selectively moved into operative position substantially normal to the direction of the light bundle entering said opening, a measuring instrument located within said casing and circuit means for connecting said cells in parallel to said measuring instrument.

14. A photographic exposure meter comprising a casing having an opening to admit light rays reflected from a photographic scene towards which the meter is pointed, a light confining chamber behind said opening, a plurality of photoelectric cells having varying characteristics hingedly connected to the walls of said chamber at the side opposite from said opening so as to lie against said walls in the non-operative position and adapted to be selectively moved into operative position substantially normal to the direction of the light bundle entering said opening, and a plurality of cover members hingedly connected to said walls near said opening to conceal said photoelectric cells, spring means urging said cover members against said cells in the non-operative positions and to allow lifting said cover members about their pivotal axes and to return to their resting positions when said cells are moved from their non-operative to their operative positions and vice versa, a measuring instrument located within said casing and circuit means for connecting said cells in parallel to said measuring instrument.

15. An exposure meter as claimed in claim 13, said photoelectric cells having different effective areas and designed to represent different values of an exposure controlling magnitude.

16. An arrangement as claimed in claim 4 including means for preventing lateral light rays from affecting said cells in the non-operative position.

JOSEPH M. BING.